June 2, 1959     M. FOGIEL     2,889,506
CIRCUIT OF MATHEMATICAL FUNCTIONS
Filed Feb. 4, 1957     2 Sheets-Sheet 1

INVENTOR.
Max Fogiel

June 2, 1959   M. FOGIEL   2,889,506
CIRCUIT OF MATHEMATICAL FUNCTIONS
Filed Feb. 4, 1957   2 Sheets-Sheet 2
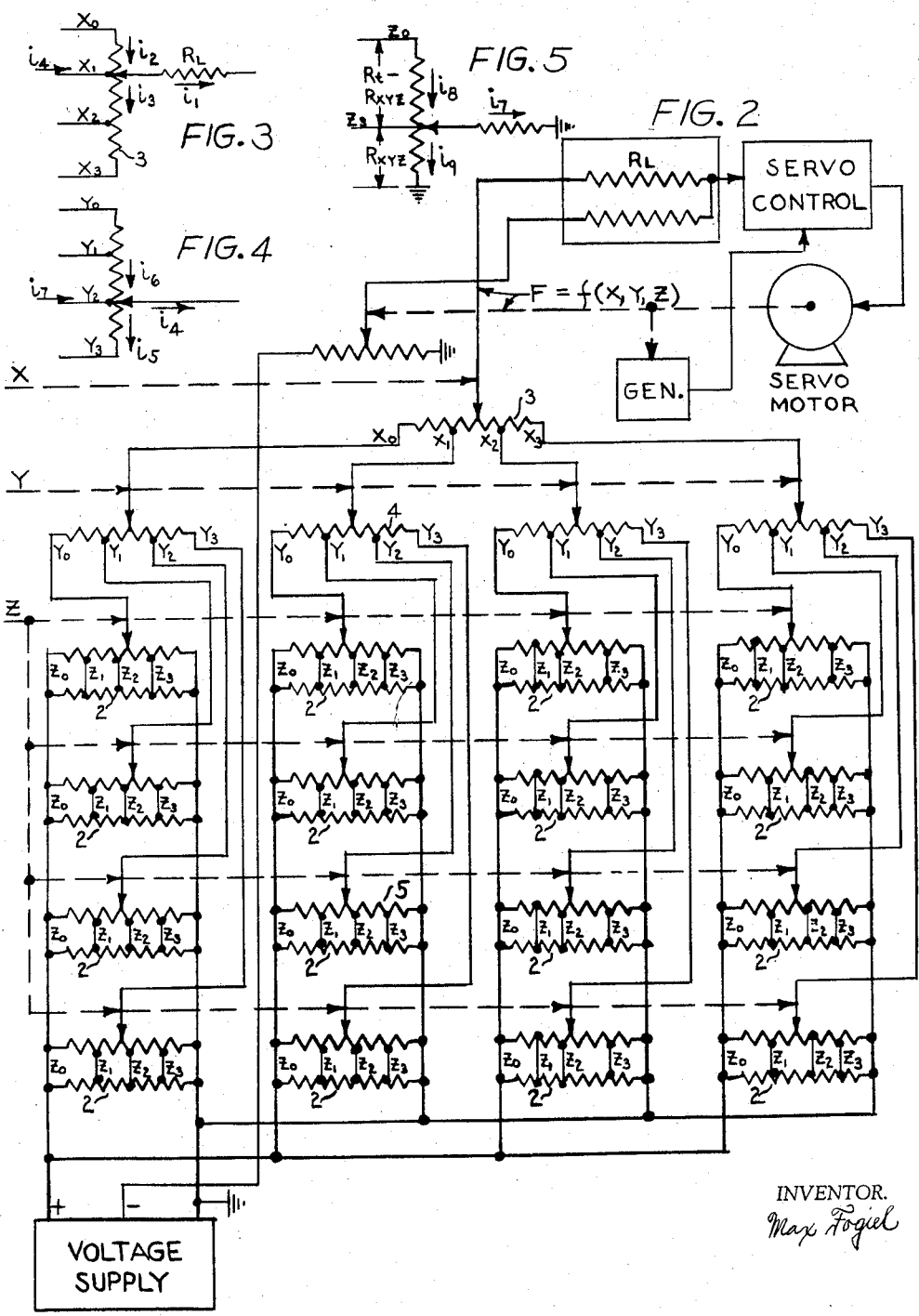

United States Patent Office … 2,889,506
Patented June 2, 1959

2,889,506

CIRCUIT OF MATHEMATICAL FUNCTIONS

Max Fogiel, New York, N.Y.

Application February 4, 1957, Serial No. 638,032

2 Claims. (Cl. 318—28)

This invention relates to a circuit which computes the value of any function which is dependent on one or more independent variables.

An object of this invention is to compute the values of empirical functions by means of passive networks. The networks are to be constructed so as not to attenuate the output.

Another object of this invention is to perform the required computation within any desired degree of accuracy.

Figure 2 shows the mechanization of a function having three or more independent variables by means of potentiometers and a servo system to provide either an electrical or mechanical output.

Figure 3 is an analytical diagram of the potentiometer positioned by the variable $x$.

Figure 4 is an analytical diagram of the potentiometer positioned by the variable $y$.

Figure 5 is an analytical diagram of the potentiometer positioned by the variable $z$.

Figure 1:
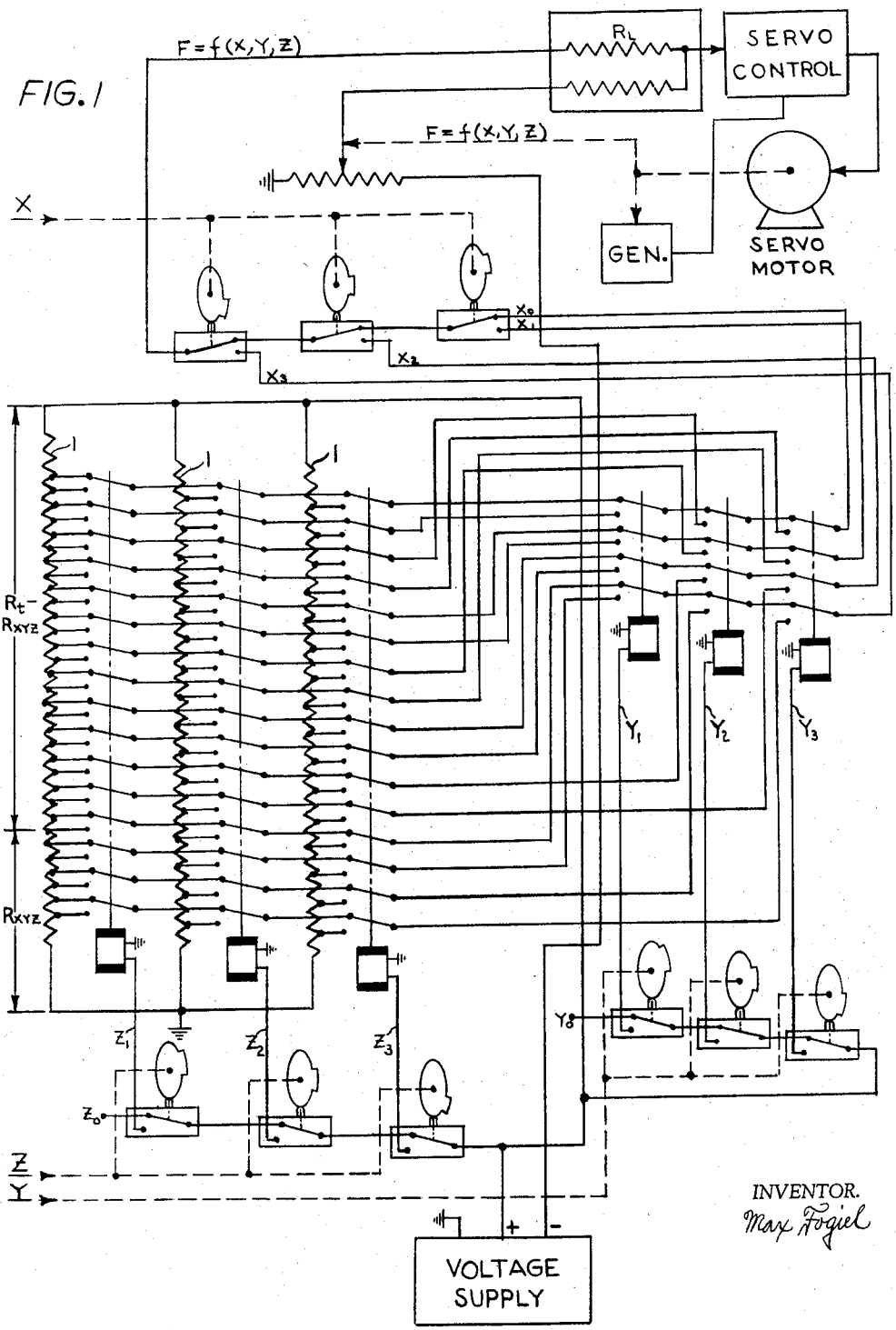
Figure 1 illustrates the mechanization of a function having three or more independent variables by means of relays, switches, and a servo system to provide either an electrical or mechanical output.

The circuit shown in Figure 1 will provide an electrical or mechanical output which is a function of three independent variables. While only three independent variables have been selected for the purpose of illustration, the circuit may be extended to include any number of independent variables.

The data for the circuit will, in general, be supplied in tabular form. While this data is usually presented for equal increments of the independent variable, the circuit as shown in Figure 1 will just as easily accommodate data given for random intervals.

The circuit of Figure 1 may be explained in the following manner. Let the function $F=f(x, y, z)$ be defined in the domain $(x_0, x_1, x_2 \ldots x_p)$ $(y_0, y_1, y_2, \ldots y_q)$, $(z_0, z_1, z_2, \ldots z_r)$. If $y$ and $z$ are held constant at a given set of values while $x$ is allowed to vary through its range, the function $F$ will assume $p$ discrete values as dictated by the given values of $x$. If this procedure is repeated for all the different values of $y$ with $z$ still held constant however, $(p)(q)$ discrete values will be obtained for $F$. If $z$ is now also allowed to vary through its range, $(p)(q)(r)$ discrete values will be obtained for $F$. The relay circuit of Figure 1 is arranged so that one and only one distinct value of $F$ is obtained for any combination of $(x, y, z)$ within the given domain. The resistances of voltage dividers 1 are calculated to give the required output values for $F$. If $R_L$ is large compared to the total resistance of the voltage divider, a negligible loading effect will be present and the voltage $V_{xyz}$ for a given set of $(x, y, z)$ values will be given by the relation $$V_{xyz}=\frac{R_{xyz}}{R_t}(V) \tag{1}$$

$V$ is the reference voltage and $V_{xyz}$ is obtained from the relation $$V_{xyz}=\frac{F_{xyz}}{F}(V) \tag{2}$$

where $F_{xyz}$ is the value of the function evaluated for the given set of $(x, y, z)$ values and $F$ is the total range of $F$ within the given domain.

For illustrative purposes only $p$, $q$, and $r$ have each been chosen as four in Figure 1. This yields 64 distinct values for $F$ as shown in the diagram.

While the diagram indicates a series of switches to operate the relays, it is not essential that they be employed exclusively. A commutator and brush assembly or any other equivalent switching device may be applied for this purpose.

The servo system is present in the diagram to obtain the quantity $F$ in the mechanical form. If $F$ is required in the electrical form only, the servo system may be omitted from the circuit.

The circuit of Figure 1 provides a digital form of output. For given values of any two of the variables, $F$ will be a step function of the third variable. These steps, however, may be made as small as desired by subdividing the range of the variable into any number of increments. Again, these increments need not be equal. In this manner any required degree of accuracy may be obtained.

The step quality of the relay circuit of Figure 1 may be eliminated by employing the circuit of Figure 2. All of the potentiometers present in the circuit are of the linear tapped type. The taps are spaced in accordance with the increments determined by the required degree of accuracy as already discussed. Instead of experiencing a sharp step change in output when going from one increment to the other, a continuous smooth function will be obtained. The resistances of the potentiometers are determined by the allowable load on the reference voltage. If this allowable load is $R$ and the circuit of Figure 2 is used, the resistances of each potentiometer is 37R.

The tap resistors on the $z$ driven potentiometers may be computed in the following manner. Assume the sliders of the potentiometers are located at the $(x_1, y_2, z_3)$ positions. $V_{xyz}$ is thus determined from Relation 2. Referring to potentiometer 3 in Figure 3, the currents $i_1$, $i_2$, $i_3$, and $i_4$ are evaluated by $$i_1=\frac{V_{xyz}}{R_L}\bigg]_{\substack{x=x_1\\y=y_2\\z=z_3}} \tag{3}$$

$$i_2=\frac{V_{xyz}}{R_2}\bigg]_{\substack{x=x_0\\y=y_2\\z=z_3}}-\frac{V_{xyz}}{R_2}\bigg]_{\substack{x=x_1\\y=y_2\\z=z_3}} \tag{4}$$

$$i_3=\frac{V_{xyz}}{R_3}\bigg]_{\substack{x=x_1\\y=y_2\\z=z_3}}-\frac{V_{xyz}}{R_3}\bigg]_{\substack{x=x_2\\y=y_2\\z=z_3}} \tag{5}$$

$$i_4=i_1+i_3-i_2 \tag{6}$$

The numerical subscripts of the resistances correspond to the magnitude of the potentiometer resistance in the increment corresponding to the current.

The circuit of potentiometer 4 in Figure 4 is similarly determined by $$i_5=\frac{V_{xyz}}{R_5}\bigg]_{\substack{x=x_1\\y=y_2\\z=z_3}}-\frac{V_{xyz}}{R_5}\bigg]_{\substack{x=x_1\\y=y_3\\z=z_3}} \tag{7}$$

$$i_6=\frac{V_{xyz}}{R_6}\bigg]_{\substack{x=x_1\\y=y_1\\z=z_3}}-\frac{V_{xyz}}{R_6}\bigg]_{\substack{x=x_1\\y=y_2\\z=z_3}} \tag{8}$$

$$i_7=i_4+i_5-i_6 \tag{9}$$

The tap resistors for the $z$ driven potentiometers are evaluated from Figure 5 which is the equivalent circuit of the $z$ potentiometer 5 and its tap resistors.

$$R_{xyz} = \frac{V_{xyz}}{i_9} \tag{10}$$

$$i_9 = i_8 - i_7 \tag{11}$$

$$i_8 = \frac{V}{R_t} \tag{12}$$

With $R_{xyz}$ determined at the point in question it is possible to evaluate the tap resistors from the fact that the tap resistor is in parallel with the pot resistance between the taps. By permitting the $z$ potentiometers to be of the functional wound type, it is possible to eliminate the tap resistors. The functional windings of the potentiometers are determined by the nature of $R_{xyz}$.

I claim:

1. In a circuit comprising a first switching means adapted to provide a different electrical path for each different position of said switch, said switching means being positioned by a first independent variable, a first series of relays, the corresponding armatures of said relays being connected in series when said relays are in the normal unoperated position, a path from each armature of the last of said series connected relays to the corresponding path of said first switching means, a second switching means identical in construction of said first switching means to provide a different signal output for each different position of said second switch, a path from each said signal output of said switching means to the coil of the corresponding relay of said first series of relays, said switching means being positioned by a second independent variable, a third series of relays, the corresponding armatures of said relays being connected in series when said relays are in the normal unoperated position, a path from each armature of the last of said series connected relays to the corresponding terminal of said first series of relays, said terminal being that terminal which is in contact with the armature when the relay is operated, a third switching means identical in construction of said second switching means to provide a different signal output for each different position of said third switch, said third switching means being positioned by a third independent variable, a path from each said signal output of said third switching means to the coil of the corresponding relay of said second series of relays, a voltage dividing circuit, a path from each terminal of said third series of relays to the corresponding selected terminal of said voltage dividing circuit, said terminal of said third series of relays being that terminal which is in contact with its armature when the relay is operated, and a power supply for said relays and said voltage dividing circuit.

2. The circuit of claim 1 wherein the output of said first switching means is applied to the input of a servo system comprising a feedback potentiometer, the position of said potentiometer being proportional to the output of said first switching means, a summing network to algebraically add the outputs of said switching means and feedback potentiometer, a servo motor to provide a mechanical shaft position proportional to the output of said first switching means, said servo motor being mechanically coupled to the slider of said feedback potentiometer, and a servo control to control said servo motor.

References Cited in the file of this patent

UNITED STATES PATENTS

| | | |
|---|---|---|
| 2,662,147 | Wilentchik | Dec. 8, 1953 |
| 2,713,457 | Buff | July 19, 1955 |

OTHER REFERENCES

The Design of Switching Circuits (Kirster et al.), published by D. Van Nostrand Co., Inc., New York, 1951, pages 307–308 and 327–331.